(12) United States Patent
McCollough

(10) Patent No.: US 12,448,074 B2
(45) Date of Patent: Oct. 21, 2025

(54) MOTORCYCLE CHAIN OILING TOOL FOR AEROSOL LUBRICATION

(71) Applicant: William Ferrell McCollough, Laurel, MD (US)

(72) Inventor: William Ferrell McCollough, Laurel, MD (US)

( * ) Notice: Subject to any disclaimer, the term of this patent is extended or adjusted under 35 U.S.C. 154(b) by 0 days.

(21) Appl. No.: 18/391,259

(22) Filed: Dec. 20, 2023

(65) Prior Publication Data

US 2025/0033728 A1    Jan. 30, 2025

Related U.S. Application Data

(60) Provisional application No. 63/516,517, filed on Jul. 30, 2023.

(51) Int. Cl.
*B62J 31/00* (2006.01)
*F16N 5/02* (2006.01)

(52) U.S. Cl.
CPC ............... *B62J 31/00* (2013.01); *F16N 5/02* (2013.01); *F16N 2210/33* (2013.01)

(58) Field of Classification Search
CPC ........ B62J 31/00; F16N 5/02; F16N 2210/33; F16H 57/05; B65G 45/08; B05C 1/04
See application file for complete search history.

(56) References Cited

U.S. PATENT DOCUMENTS

| | | | |
|---|---|---|---|
| 3,720,289 A | 3/1973 | Moldenhauer | |
| 4,815,637 A | 3/1989 | Nellis | |
| 5,020,637 A | 6/1991 | Hoenselaar | |
| 5,269,614 A | 12/1993 | Taylor | |
| 5,484,038 A | 1/1996 | Rowell | |
| 6,257,369 B1 | 7/2001 | Pesl | |
| 6,942,409 B2 * | 9/2005 | Barbieri | B08B 3/02 |
| | | | 401/9 |
| 8,757,325 B2 * | 6/2014 | Singer | B05C 1/04 |
| | | | 184/11.5 |
| 9,079,720 B1 | 7/2015 | Schmidt | |
| 11,634,108 B2 * | 4/2023 | Romzek | B60S 3/044 |
| | | | 15/347 |
| 2005/0000752 A1 | 1/2005 | Fleige | |
| 2009/0165229 A1 | 7/2009 | Yu | |
| 2009/0223745 A1 * | 9/2009 | Marcucci | F16N 7/32 |
| | | | 222/395 |

\* cited by examiner

*Primary Examiner* — Minh Truong

(57) ABSTRACT

The present disclosure provides systems, devices and methods for using an oiling tool that allows the mechanic to apply a stream of atomized spray of oil to the top of the inner links of a motorcycle chain and on both sides as the chain is turned along with the motorcycle wheel.

15 Claims, 15 Drawing Sheets

MOTORCYCLE CHAIN OILING TOOL FOR AEROSOL LUBRICATION

CROSS REFERENCE TO RELATED APPLICATIONS

This application claims the benefit of priority under 35 USC § 119 (e) to U.S. Provisional Application No. 63/516,517, titled "NOVEL MOTORCYCLE CHAIN OILING TOOL FOR AEROSOL LUBRICATION," filed on Jul. 30, 2023, the entire disclosure of which is hereby incorporated by reference in its entirety for all purposes.

TECHNICAL FIELD OF THE INVENTION

The present disclosure generally relates to a device for lubrication of motorcycle chains, and more particularly to devices and methods directed for use as a motorcycle chain oiling tool for aerosol lubrication.

BACKGROUND OF THE INVENTION

The motorcycle industry has long been dominated by chain propulsion. The motorcycle chain forms an oval as it surrounds the rear wheel sprocket and the front sprocket. The chain is formed from steel links and rollers and plates that are held together by pins.

Depending on the displacement of the motor, chains will vary in size and tensile strength. The motorcycle chain is external and therefore vulnerable to the elements of water, mud, debris, and rust. Chains with steel links and plates that rub against each other require oil to prolong the life of the chain and sprockets and to maintain a linkage that rotates freely around the sprockets.

Chain oil application has been a haphazard technique of trying to spray the links so they all are lubricated and protected. Typically the mechanic sprays a lubricant from an aerosol can near the chain. This results in overspray that is wasteful and deposits the oil on tires, rims, hub, spokes, swingarm, and brakes. The aerosol can comes with a straw to allow the mechanic to get closer to the chain and more accurately apply the spray. This results in a pin-point spray stream the makes it difficult to lubricate all the plate faces and rollers.

SUMMARY OF THE INVENTION

The present disclosure provides systems, devices and methods for using an oiling tool that allows the mechanic to apply a stream of atomized spray of oil to the top of the inner links of a motorcycle chain and on both sides as the chain is turned along with the motorcycle wheel. The oiling tool places the oil at the critical location for oiling all the links quickly and easily using two accurate and simultaneous atomized spray streams of oil. In one revolution of the chain, oil can be deposited everywhere it needs to be and not where it is not needed.

The oiling tool is designed to easily and quickly position the spray streams using the oiling tool attached to the aerosol can with a straw for dispensing the oil.

The oiling tool is designed to spray the oil on top of the inside link on both sides. Because of the need for accurate positioning of the spray the oiling tool must be made to each specific chain size. Smaller displacement motorcycles have smaller chains and therefore will require the oiling tool that sprays the two streams closer together than a larger chain.

BRIEF DESCRIPTION OF THE DRAWINGS

The disclosure, in accordance with one or more various embodiments, is described in detail with reference to the following figures. The drawings are provided for purpose of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE INVENTION

Figure 1:
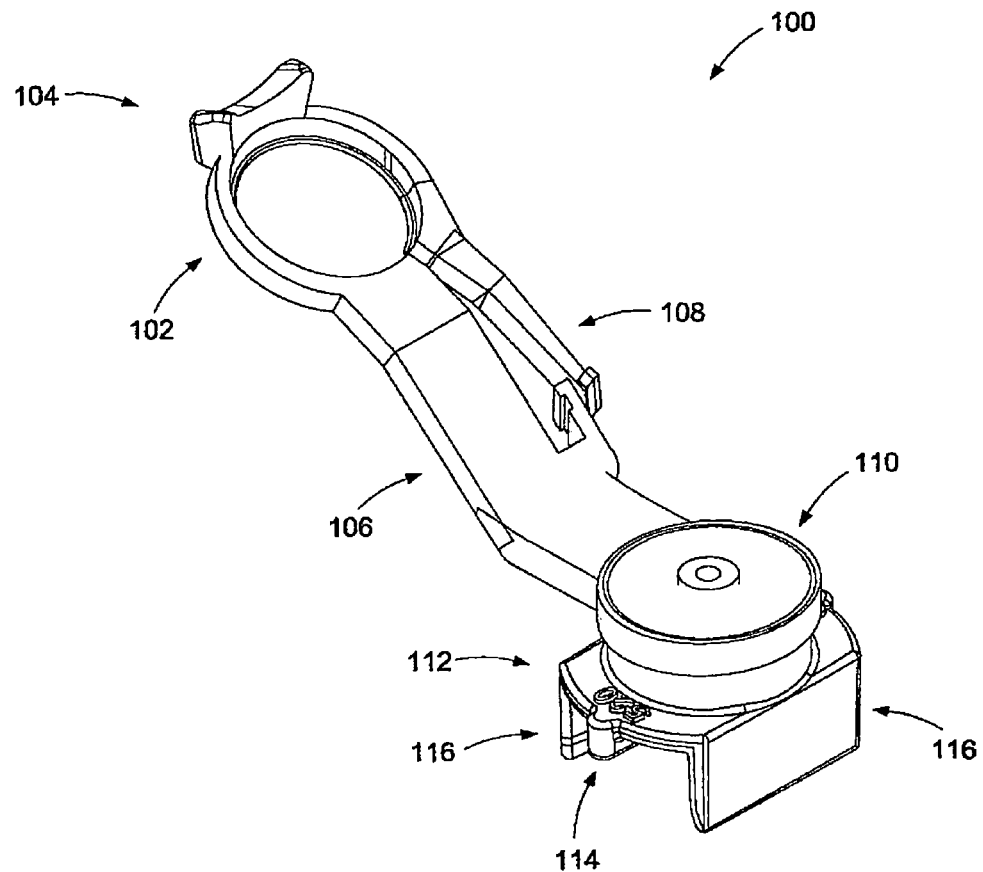
FIG. 1 illustrates an embodiment of a top side view of an oiling tool.

The present disclosure provides a chain drive lubricating system with a lubricating tool having a collar for reversibly attaching to an aerosol can; an adapter with an entry or axial opening for receiving lubricating fluid; an arm for connecting the collar to the adapter; a dispenser with an exit opening for connecting to the adapter, wherein the adapter and dispenser form a chamber including the entry opening for receiving lubricating fluid and an exit opening for dispensing lubricating fluid onto a chain drive.

In one aspect the disclosure provides a chain drive lubricating system, wherein the collar is reversibly attachable to an aerosol can.

In another aspect the disclosure provides a chain drive lubricating system, wherein the collar is a circular collar that is reversibly attachable to an upper ridge of a nozzle housing unit on an aerosol can.

In another aspect the disclosure provides a chain drive lubricating system, wherein the collar is a semi-circular collar that is reversibly attachable to a double seam on an aerosol can.

In another aspect the disclosure provides a chain drive lubricating system, wherein the collar includes a fingerpad.

In another aspect the disclosure provides a chain drive lubricating system, wherein the arm includes a lever.

In another aspect the disclosure provides a chain drive lubricating system, wherein the adapter includes a cylinder with the entry or axial opening for receiving lubricating fluid through a straw connected to a pushbutton on an aerosol can.

In another aspect the disclosure provides a chain drive lubricating system, wherein the adapter and dispenser form the chamber including two exit openings on the floor of the chamber for dispensing lubricating fluid to each side of a chain drive.

In another aspect the disclosure provides a chain drive lubricating system, wherein the dispenser includes a center guidepost between the two exit openings on the floor of the chamber.

In another aspect the disclosure provides a chain drive lubricating system, wherein the dispenser includes a side guiderail.

In another aspect the disclosure provides a chain drive lubricating system, wherein the dispenser includes two side guiderails.

In another aspect the disclosure provides a chain drive lubricating system, wherein the dispenser includes an O-ring to rotatably attach the adapter about an axis.

In another aspect the disclosure provides a chain drive lubricating system, wherein the dispenser includes a latch to rotatably attach the adapter about an axis.

In another aspect the disclosure provides a chain drive lubricating system, wherein the dispenser includes two latches for reversibly attaching the adapter.

In another aspect the disclosure provides a chain drive lubricating system, wherein the dispenser includes one or more pins and the adapter includes a corresponding one or more slots for attaching the one or more pins for rotatably attaching the adapter about an axis.

In another aspect the disclosure provides a chain drive lubricating system, wherein the dispenser includes four pins and the adapter includes four slots.

In another aspect the disclosure provides a chain drive lubricating system, wherein the dispenser includes a screw valve mechanism for controlling flow of lubricating fluid into the adapter.

In another aspect the disclosure provides a chain drive lubricating system, wherein a screw of the screw mechanism reversibly penetrates the entry or axial opening of the adapter.

In another embodiment, the disclosure provides a method of applying lubricating fluid to a chain drive, having a) centering a detachable dispenser of a lubricating tool over a chain drive, wherein the lubricating tool includes a collar, an arm, an adapter, and the detachable dispenser, wherein the adapter and dispenser form a chamber including an entry or axial opening and an exit opening; and b) applying lubricating fluid from an aerosol can attached to the lubricating tool through a straw into the entry or axial opening, the chamber, and out through the exit opening onto the chain drive.

FIG. 1 illustrates an embodiment of a top side view of an oiling tool 100, which includes a proximal collar 102 with a fingerpad 104, a middle arm region 106 with a lever 108, and a distal adapter 110 connected to a dispenser 112 having a guidepost 114 and guiderails 116.

The collar 102 is designed to secure an aerosol can (not shown) and can be either a full circular collar that surrounds an upper ridge (mounting cup) of an aerosol can housing nozzle completely, or a semi-circular collar that surrounds half of the double seam of an aerosol can. As used herein, the term "double seam" refers to a hermetic seal created by interlocking the edges (flanges) both of the cover (lid or end) and body of an aerosol can.

In addition, the dispenser 112 can either be fixed in place or can be rotatable around and detachable from the adapter 110.

In different embodiments, the oiling tool system described herein can be made of any suitable materials including but not limited to plastic, polymers, and the like. In addition, the oiling tool system components may be of any suitable size sufficient for its purpose of oiling a motorcycle chain.

Figure 2:
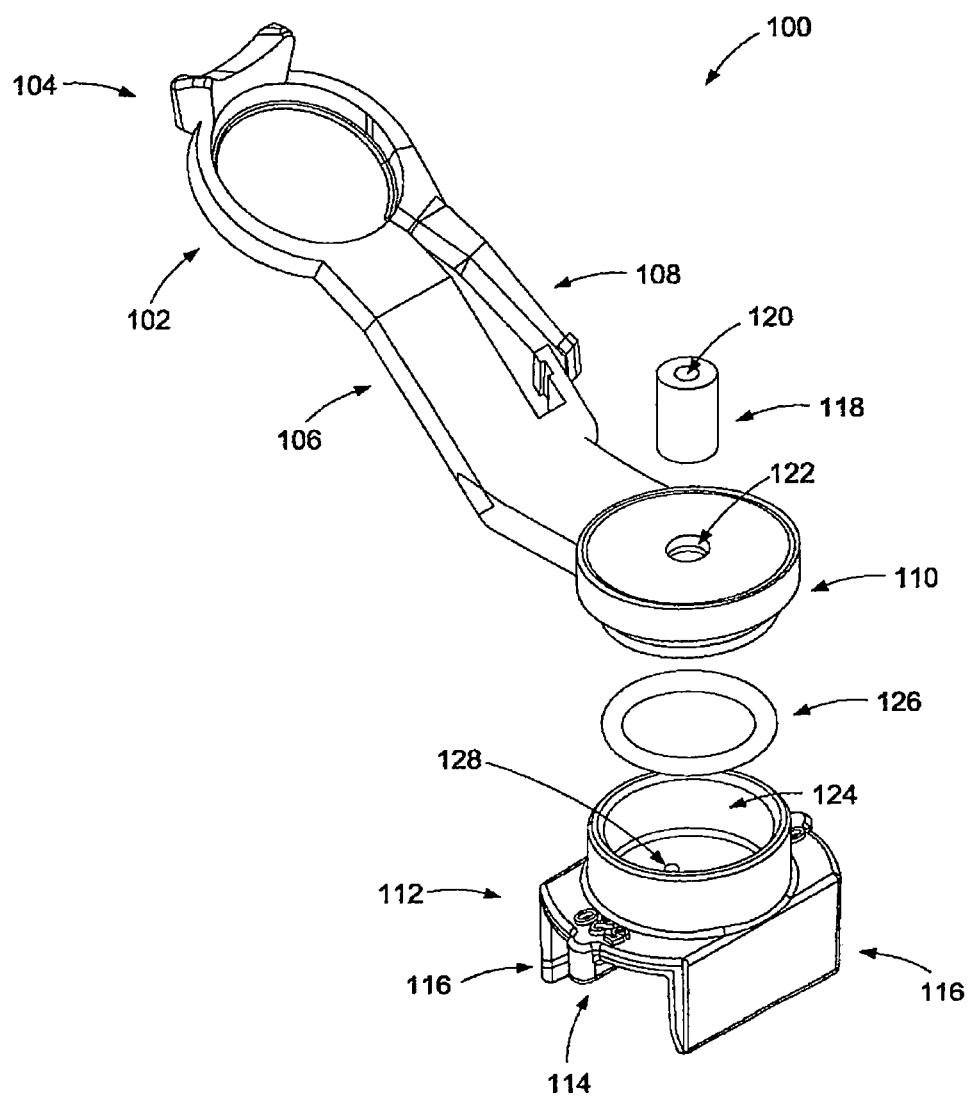
FIG. 2 illustrates an embodiment of an exploded view of the oiling tool.

FIG. 2 illustrates an embodiment of an exploded view of the oiling tool 100 showing the collar 102, fingerpad 104, arm 106, lever 108, adapter 110, dispenser 112, guidepost 114, and guiderails 116. In addition, cylinder 118 forms a fitted seal into the center opening 122 of the adapter 110. The cylinder 118 includes an entry opening, i.e., an axial opening 120 for the adapter 110, and a chamber 124 in the dispenser 112 is provided to capture fluid from an aerosol can. Cylinder 118 can be made as a rubber insert or part of the molded plastic. The removable cylinder 188 can take on any shape that is necessary to fit the center opening 122 and a method of attachment could include but is not limited to a press fit, screws, or threads. Also shown is an O-ring 126, which prevents any leakage of fluid in the chamber 124 between the adapter 110 and dispenser 112. Finally, one or more exit openings 128 can be located on the base of the chamber 124, which allows fluid in the chamber to drain out.

Figure 3:
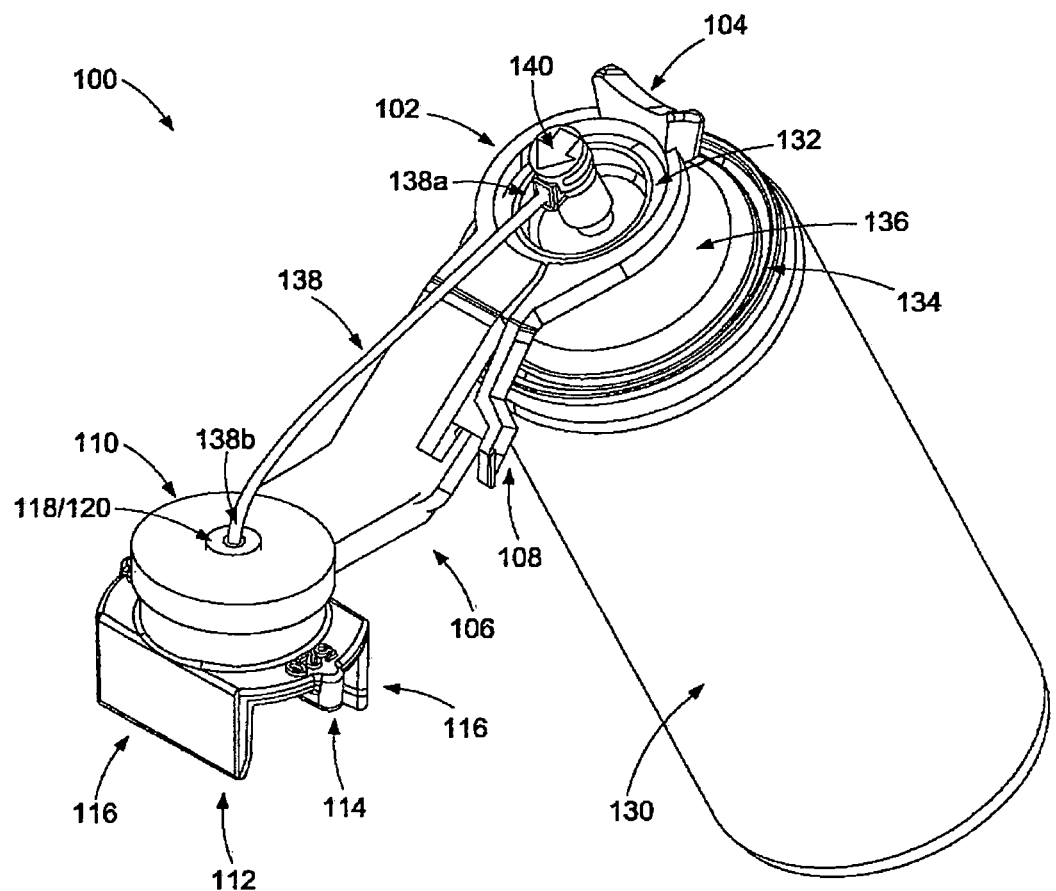
FIG. 3 illustrates an embodiment of a top side view of the oiling tool attached to an aerosol can.

FIG. 3 illustrates an embodiment of a top side view of the oiling tool 100 attached to an aerosol can 130. The collar 102 can be used to fasten to and secure the aerosol can 130 through either the upper ridge 132 of the nozzle housing 136 (see, FIG. 3) or through the double seam 134 of an aerosol can 130 (see, FIG. 4).

As used herein, the upper ridge 132 refers to part of the nozzle housing 136, which holds the valve mechanism that releases the aerosol in an aerosol can through an actuator or pushbutton 140.

In a first embodiment as shown in FIG. 3, the collar 102 can completely surround and clip onto the upper ridge 132 of the nozzle housing 136 to securely hold it in place while being used. The bottom of the collar 102 can also include a lower lip that extends under the nozzle housing 136 to keep it attached (not shown).

The collar 102 can be secured tightly around the nozzle housing 136 to prevent the collar from spinning on its axis through means of the lever 108. In addition, the arm 106 includes a finger-pad 104 on the collar 102 to enhance the ergonomics of the oiling tool 100 and for the user to feel the position of the oiling tool without having to visually see it.

Aerosol cans are typically provided with a straw 138 to reach hard to get areas. The straw 138 can be inserted into the entry or axial opening 120 of the cylinder 118 of the oiling tool 100. The entry or axial opening 120 of the cylinder 118 can be tapered so that the straw 138 forms a pressured fit and can be sealed to prevent leakage. The entry or axial opening 120 can also be designed to allow a variety of straw diameters to be used. The cylinder 118 can be made of plastic, polymers, rubber and the like.

A connecting straw 138 can be used to transfer fluid from the aerosol can 130 to the dispenser 112 including the chamber 124. As shown in this figure, one end of the connecting straw 138a can be inserted into the pushbutton 140 of the aerosol can 130 and the other end of the connecting straw 138b can be inserted into the entry or axial opening 120 of the cylinder 118 in the dispenser 112. In some embodiments, the entry or axial opening 120 can be tapered in order to form a tight seal between the end of the straw 138b and the chamber 124 of the dispenser 112.

Figure 4:
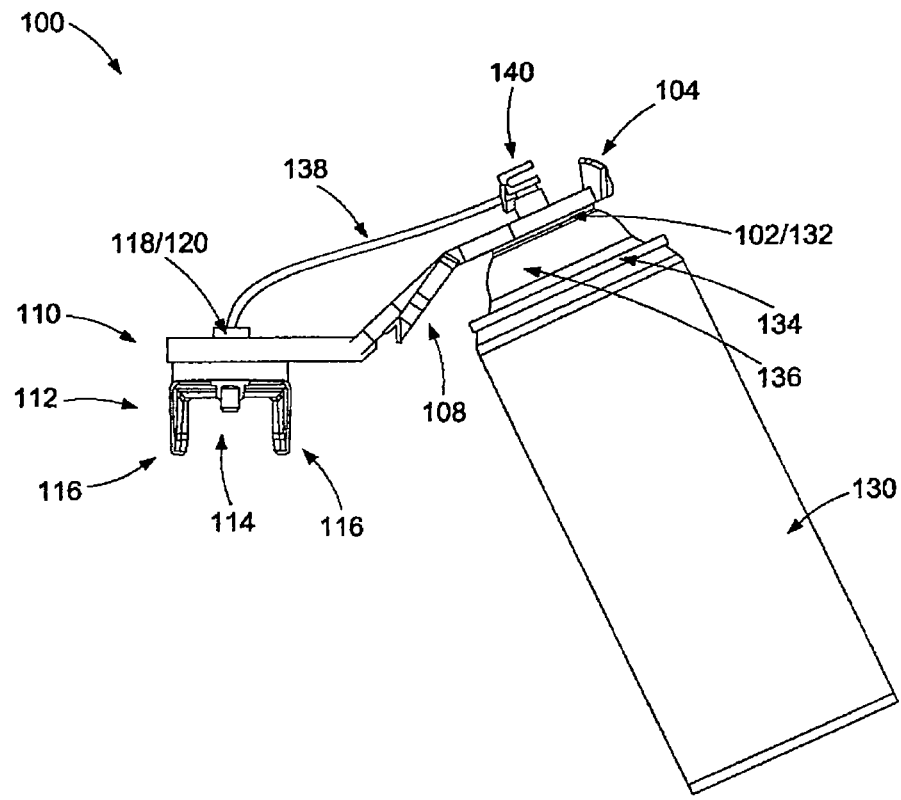
FIG. 4 illustrates an embodiment of a side view of the oiling tool attached to an aerosol can.

FIG. 4 illustrates an embodiment of a side view of the oiling tool 100 attached to an aerosol can 130 as per FIG. 3. As shown in this figure, the dispenser 112, guidepost 114, and guiderails 116 are arranged to accommodate a motorcycle chain for lubrication by transferring fluid from the aerosol can 130 through the straw 138 and into the chamber 124 and exit openings 128 of the dispenser 112 (see, FIG. 5).

Figure 5:
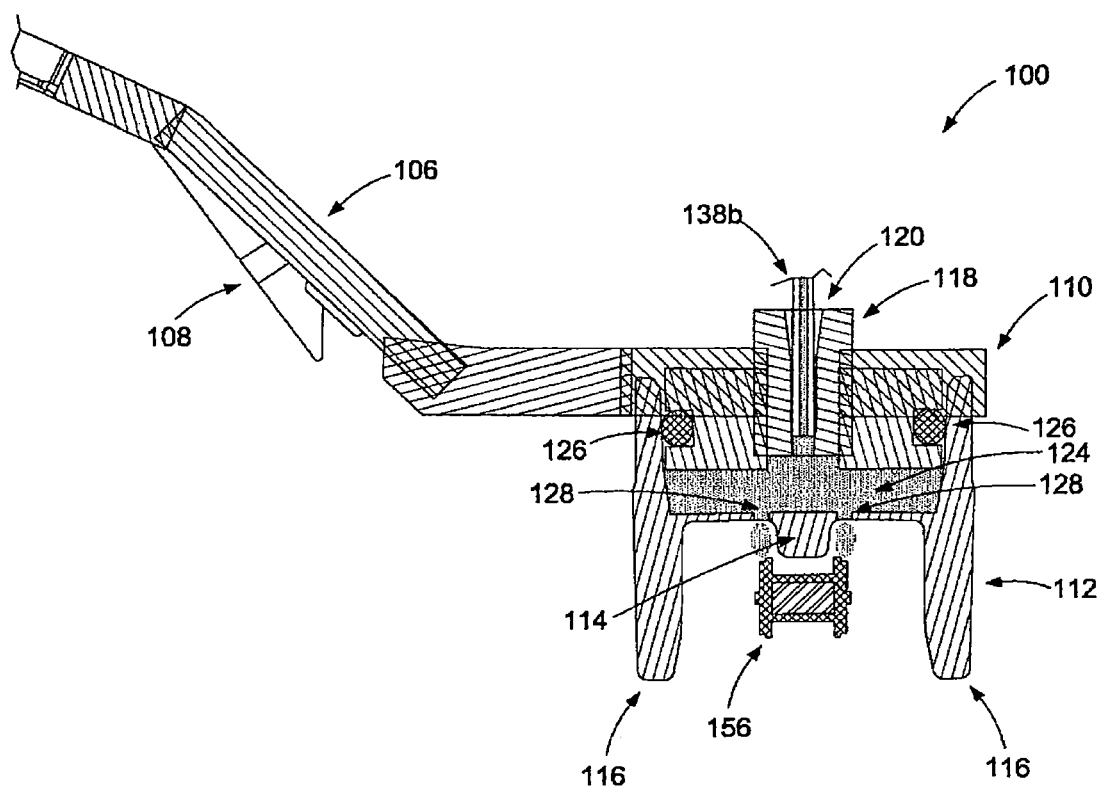
FIG. 5 illustrates an embodiment of a cut-away side view of the oiling tool.

FIG. 5 illustrates an embodiment of a cut-away side view of the oiling tool 100 as per FIG. 4. As shown in this figure, the dispenser 112, guidepost 114, and guiderails 116 are arranged to accommodate a motorcycle chain 156 for lubrication. An aerosolized spray can move down the connecting straw 138 from the aerosol can source. The straw fitted in the entry or axial opening 120 injects spray through cylinder 118 and into the chamber 124 (see, FIG. 2). The chamber 124 is an open space bound on the top by the adapter 110, the cylinder 118, and on the bottom by the dispenser 112. A rubber O-ring 126 can create a seal to prevent the spray from escaping. The increased pressure in chamber 124 is released through exit openings 128 spaced at predetermined locations to lubricate the link plates of chain 156. The chamber 124, designed as an open cavity, facilitates a decrease in pressure in the lubricant, thereby generating foam. This foamy lubricant advantageously coats the chain uniformly, minimizing excess drip. The chamber design eliminates the need for internal branching of channels to connect the inlet port with the outlet ports and solves the problem of clogged channels.

Figure 6:
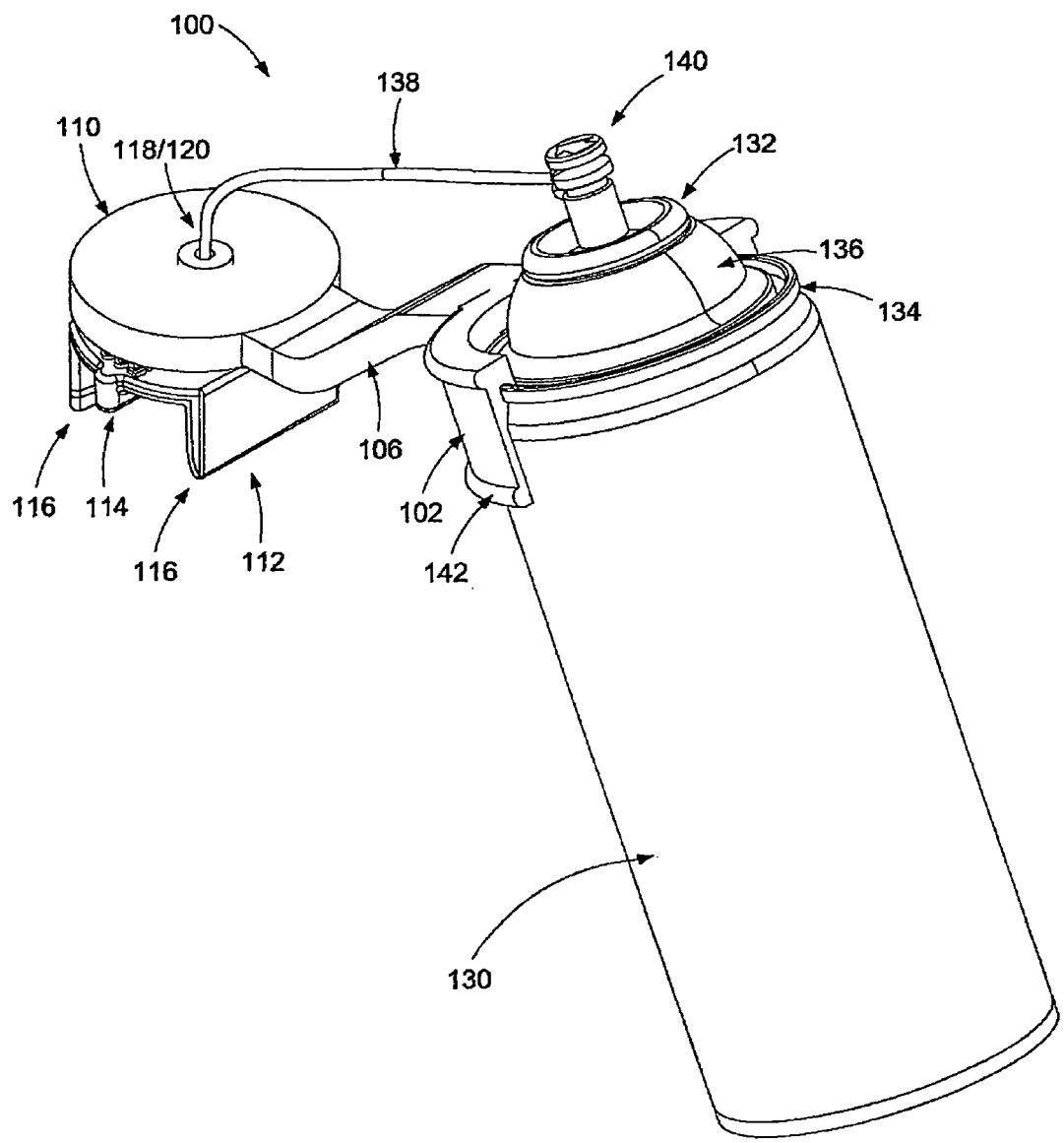
FIG. 6 illustrates another embodiment of a side view of the oiling tool attached to an aerosol can.

FIG. 6 illustrates another embodiment of a side view of the oiling tool 100 attached to an aerosol can 130. In this second embodiment, a semicircular collar 102 surrounds half of the top portion of the aerosol can 130 by attaching onto the double seam 134 to securely hold it in place while being used. Also shown is an ergonomic ridge 142 on the outer circumference of the collar 102 for ease of removal. The ergonomic ridge 142 can be located on the bottom of the collar 102 with enough height such that a user can position their finger or thumb on the oiling tool 100 to maintain a steady attachment. As before, a connecting straw 138 can be used to transfer fluid from the aerosol can 130 to the dispenser 112 as described above.

Figure 7:
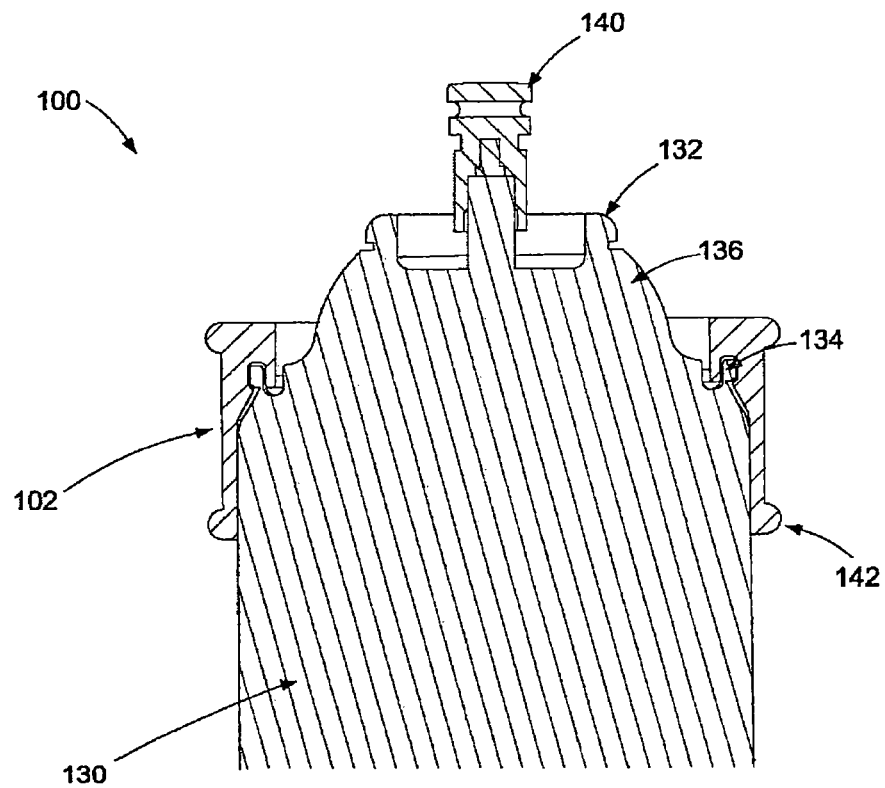
FIG. 7 illustrates an embodiment of a cut-away side view of the oiling tool attached to an aerosol can through a semicircular collar.

FIG. 7 illustrates a cut-away side view of the oiling tool 100 attached to an aerosol can 130 through a semicircular collar 102. As shown in this figure, the semicircular collar 102 surrounds half of the top portion of the aerosol can 130 by attaching onto the double seam 134 to securely hold it in place while being used. The ergonomic ridge 142 on the outer circumference of the collar 102 can be provided for ease of removal.

Figure 8:
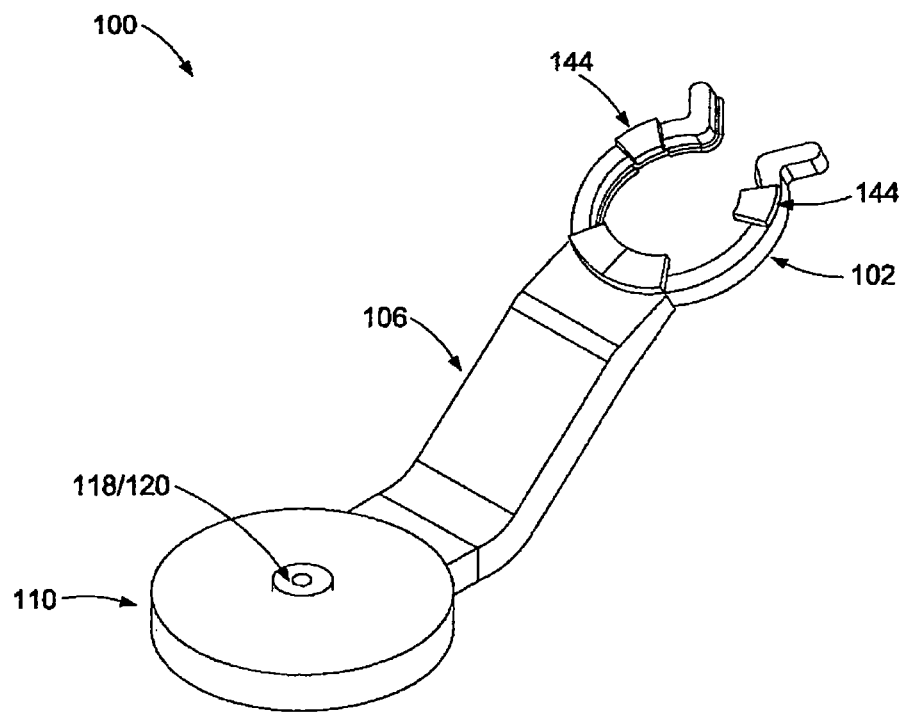
FIG. 8 illustrates an alternative embodiment of a top side view of the oiling tool.

FIG. 8 illustrates an alternative embodiment of a top side view of the oiling tool 100. As shown in this figure, the collar 102 can be circular but not connected together to form a ring. This added flexibility allows the collar to be easily attached and de-attached to the upper ridge 132 of the aerosol nozzle housing 136. In addition, the collar 102 can include one or more top plates 144, which can be arranged around the collar for inducing pressure on the lower lip on the bottom of the collar that extends under the nozzle housing 136 thereby increasing the friction on the housing. It is also possible to use spring tension to increase the friction. [not shown].

In different embodiments, the dispenser 112 can be rotatably attached to the adapter 110 of the oiling tool 100 which offers a variety of benefits. For example, as a detachable separate piece the user would be able to attach a dispenser for various chain sizes. The user may want to oil several motorcycles with different chain sizes and have a variety of dispensers and one main arm for the task. It allows for the quick attachment and detachment of the dispenser only. As with a ratchet and socket set, it is more efficient and compact to have individual sockets (a dispenser) and one ratchet (a main arm) rather than a ratchet (a main arm) attached to each socket (a dispenser).

In other embodiments, the dispenser 112 is able to rotate around the arm 106 giving the user full adjustment for better access to the chain. Access to the chain for oiling varies among the different brands of motorcycles and accessories added. Many motorcycles have access to the bottom run of the chain, while others can be blocked by passenger foot pegs, exhaust pipes, side luggage bags etc. The rotating dispenser allows for easy oiling from the side or 45 degrees if a foot peg is in the way or even parallel to the chain at the top of the back sprocket. Additionally, four wheel drive ATV's require many different angles to access the chain as well. Industrial chains require their own unique angles for access to the chain. If the dispenser can rotate 360 degrees then all situations are possible.

The attachment of the dispenser 112 to the arm 106 of the oiling tool 100 can be accomplished using several different designs. For example, as shown in FIG. 2, a rubber O-ring 126 can hold the dispenser 112 in place using friction. In this scenario, the O-ring allows the dispenser to rotate about 360 degrees.

Figure 9:
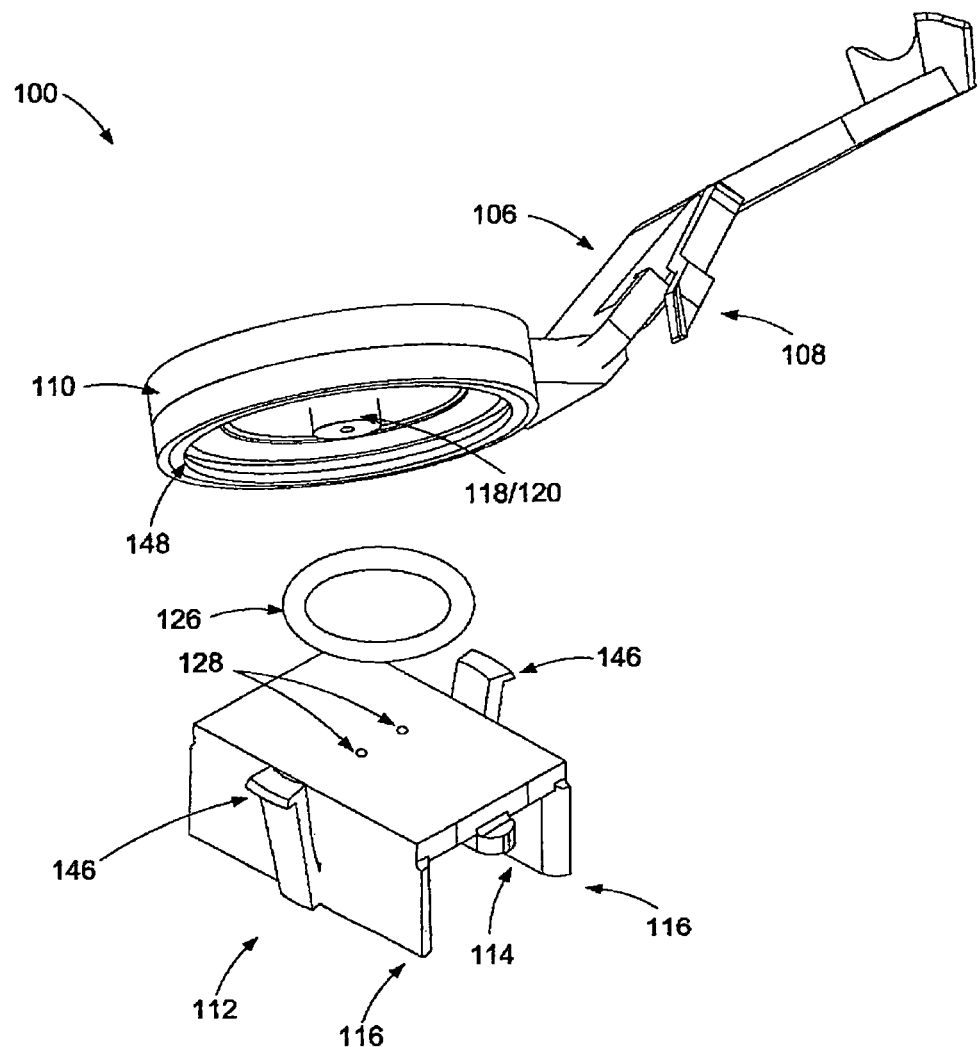
FIG. 9 illustrates an embodiment of an exploded top side view of the oiling tool with a latching system for securing the adapter to the dispenser.

FIG. 9 illustrates an embodiment of an exploded top side view of the oiling tool 100 with the adapter 110, O-ring 126 and dispenser 112 and a latching system for securing the adapter to the dispenser. In this figure, the latching system includes two flexible side arm latches 146 which can reversibly attach to the inner lip or ridge 148 of the adapter 110. This latching system also allows the dispenser 102 to rotate 360 degrees along the inner lip or ridge 148 and around the adapter 110.

Figure 10:
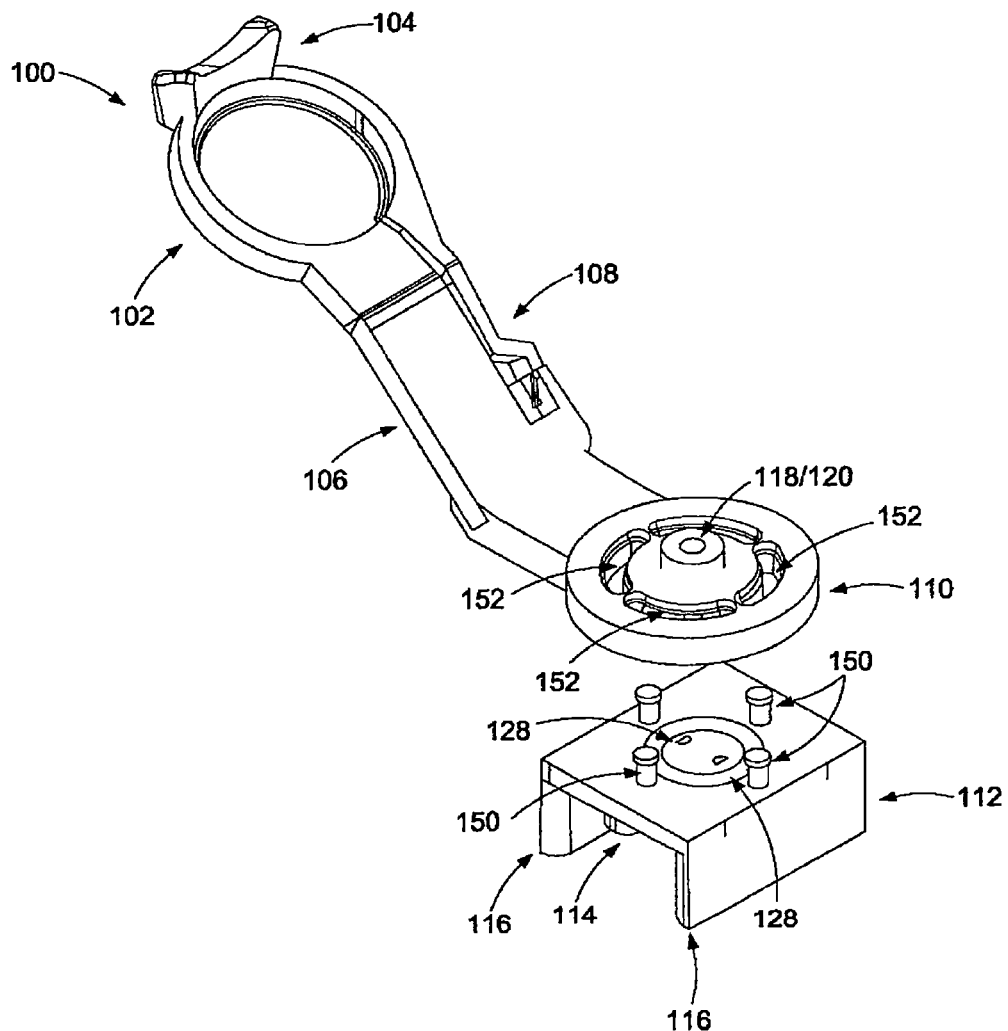
FIG. 10 illustrates an embodiment of an exploded top side view of the oiling tool with a pin and slot mechanism for securing the adapter to the dispenser.

FIG. 10 illustrates an embodiment of an exploded top side view of the oiling tool 100 with the adapter 110 and dispenser 112 and a pin and slot mechanism for securing the adapter to the dispenser. In this figure, a pin and slot mechanism is used which involves one or more pins 150 on the dispenser 112 which can extend through to individual receiving slots 152 on the adapter 110. This pin and slot mechanism allows the dispenser 112 to rotate back and forth from about 0 degrees to about 90 degrees. In another embodiment, the adapter 110 and dispenser 112 is a single connected piece, with the cylinder 118 molded separately. The cylinder 118, molded as a separate insert creates a chamber 124, bound by the cylinder 118 in the upper portion and the combined adapter-dispenser in the lower portion. The removable cylinder 118 allows access to the chamber in the event it needs to be cleaned.

Figure 11:
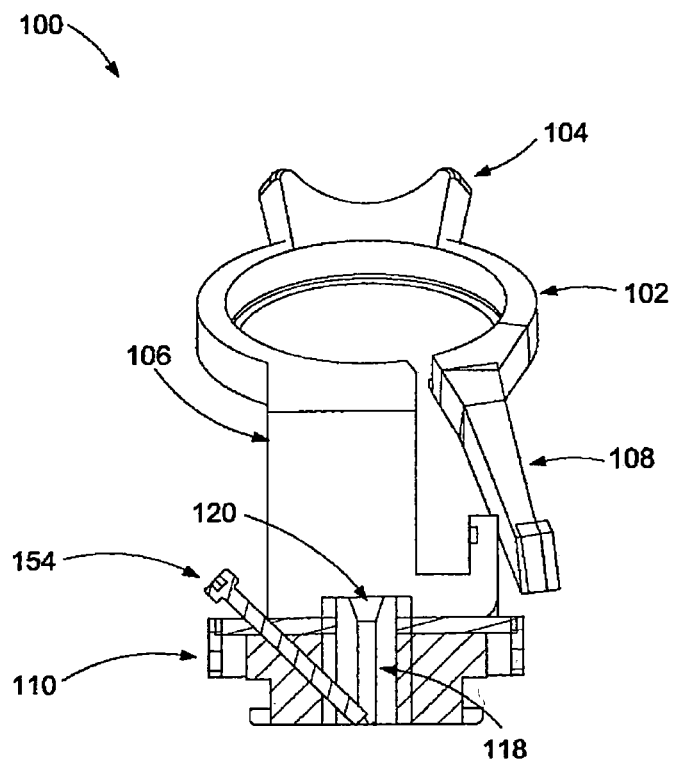
FIG. 11 illustrates an embodiment of a top side cut-away view of the oiling tool with the adapter, dispenser and a screw valve mechanism.

FIG. 11 illustrates an embodiment of a top side cut-away view of the oiling tool 100 with the adapter 110 and dispenser 112 and a screw valve mechanism with an adjusting screw 154 for controlling the flow of lubricating fluid. In this figure, the adjusting screw 154 can be threaded into a side of the cylinder 118 and into the lower region of the entry or axial opening 120. The adjusting screw 154 can be manually tightened or loosened to control the amount of spray that passes through the entry or axial opening 120 into the chamber 124. Most aerosol spray cans are pressurized to the maximum amount resulting in too much lubricant dispensed onto smaller chains. Smaller chains would benefit from less spray and less wasted lubricant. Tightening the adjusting screw can accomplish that.

Figure 12:
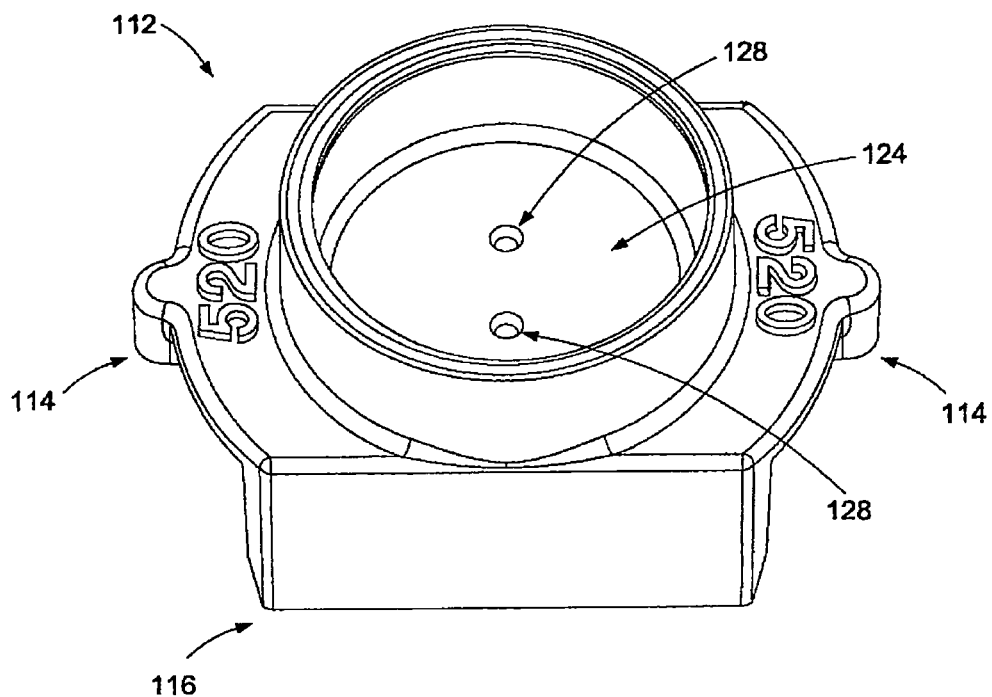
FIG. 12 illustrates an embodiment of a top side view of the dispenser with two exit openings.

FIG. 12 illustrates an embodiment of a top side view of the dispenser 112 with two exit openings 128. Also shown in this figure is the guidepost 114 and a guiderails 116. The guidepost is provided to center a motorcycle chain and the guiderails 116 are provided to prevent splashing of the lubrication fluid on the motorcycle and/or the user.

Figure 13:
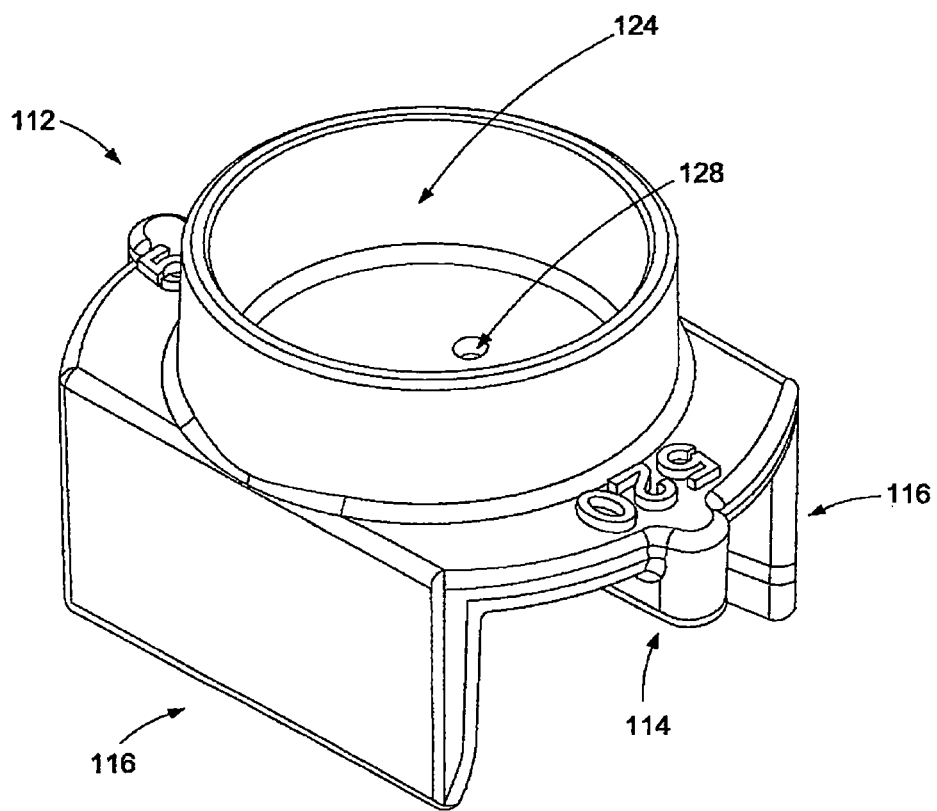
FIG. 13 illustrates an embodiment of a top side view of the dispenser with an exit opening, guiderails, and guidepost.

FIG. 13 illustrates an embodiment of a top side view of the dispenser 112 with an exit opening 128, guiderails 116, and guidepost 114. As shown, lubricating fluid can travel from the aerosol can to the chamber and out through the exit openings in the floor of the dispenser. The distance between the two exiting streams of fluid is based on the distance between the inner link plates of the motorcycle chain, or in other words, the size of the chain.

Figure 14:
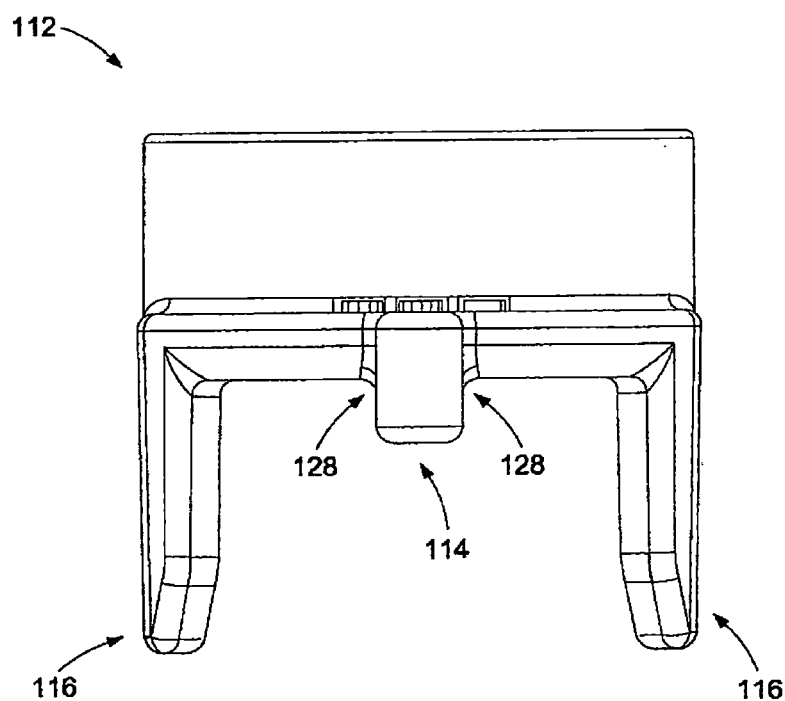
FIG. 14 illustrates an embodiment of a front side view of the dispenser equipped with a guidepost.

FIG. 14 illustrates an embodiment of a front side view of the dispenser 112 equipped with a guidepost 114. The dispenser 112 includes a guidepost 114 located between the exit openings 128 for placement on the chain. The guidepost can run along the roller part of the chain in-between the inner link plates. The separation of the two holes and the size of the guidepost can vary for each specific chain size such that the spray goes on the top of the inner link plates. The objective is to allow 50% of the spray to flow inside of the link plates to the roller, and 50% to flow between the link plates. This lubricates the essential parts of the chain.

Figure 15:
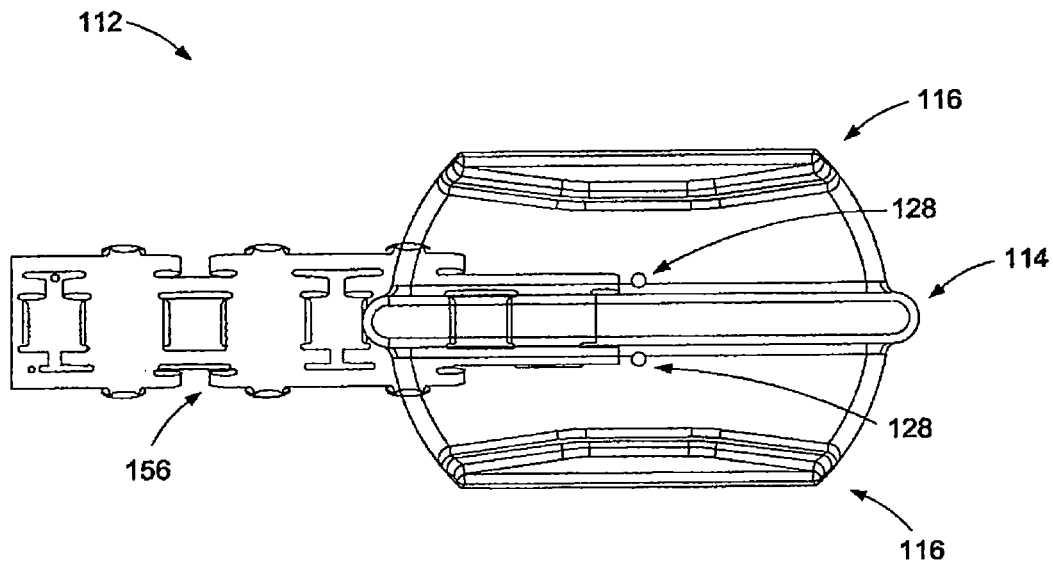
FIG. 15 illustrates an embodiment of a bottom side view of the dispenser equipped with a guidepost located between the exit openings for placement on the chain.

FIG. 15 illustrates an embodiment of a bottom side view of the dispenser 112 equipped with a guidepost 114 located between the exit openings 128 for placement on the chain. Also shown are the two guiderails 116 for preventing splash of the lubricating fluid and the chain 156 entering the dispenser 112 along the guidepost 114 and between the two guiderails 116 and under the exit openings 128.

What is claimed is:

1. A chain drive lubricating system, comprising, a lubricating tool having:
   a collar for reversibly attaching to an aerosol can;
   an adapter with an entry or axial opening for receiving lubricating fluid;
   an arm for connecting the collar to the adapter;
   a dispenser with a connection point for connecting to the adapter,
   wherein the dispenser includes a latch to rotatably attach the adapter about an axis, and
   wherein the dispenser includes two latches for reversibly attaching the adapter,
   wherein the adapter and dispenser form a chamber including the entry opening for receiving lubricating fluid and one or more exit openings for dispensing lubricating fluid onto a chain drive.

2. The chain drive lubricating system of claim 1, wherein the collar is a circular collar that is reversibly attachable to an upper ridge of a nozzle housing unit on the aerosol can.

3. The chain drive lubricating system of claim 1, wherein the collar is a semi-circular collar that is reversibly attachable to a double seam on the aerosol can.

4. The chain drive lubricating system of claim 1, wherein the collar includes a fingerpad.

5. The chain drive lubricating system of claim 1, wherein the arm includes a lever.

6. The chain drive lubricating system of claim 1, wherein the adapter includes a cylinder with the entry or axial opening for receiving lubricating fluid through a straw connected to a pushbutton on the aerosol can.

7. The chain drive lubricating system of claim 1, wherein the adapter and dispenser form the chamber including two exit openings on a floor of the chamber for dispensing lubricating fluid to each side of a chain drive.

8. The chain drive lubricating system of claim 7, wherein the dispenser includes a center guidepost between the two exit openings on the floor of the chamber.

9. The chain drive lubricating system of claim 1, wherein the dispenser includes a side guiderail.

10. The chain drive lubricating system of claim 1, wherein the dispenser includes two side guide-rails.

11. The chain drive lubricating system of claim 1, wherein the dispenser includes an O-ring to rotatably attach the adapter about an axis.

12. A chain drive lubricating system, comprising:
    a lubricating tool having:
    a collar for reversibly attaching to an aerosol can;
    an adapter with an entry or axial opening for receiving lubricating fluid;
    an arm for connecting the collar to the adapter;
    a dispenser with a connection point for connecting to the adapter,
    wherein the adapter and dispenser form a chamber including the entry opening for receiving lubricating fluid and an exit opening for dispensing lubricating fluid onto a chain drive, and
    wherein the dispenser includes one or more pins and the adapter includes a corresponding one or more slots for attaching the one or more pins for rotatably attaching the adapter about an axis.

13. The chain drive lubricating system of claim 12, wherein the dispenser includes four pins and the adapter includes four slots.

14. A chain drive lubricating system, comprising:
    a lubricating tool having:
    a collar for reversibly attaching to an aerosol can;
    an adapter with an entry or axial opening for receiving lubricating fluid;
    an arm for connecting the collar to the adapter;
    a dispenser with a connection point for connecting to the adapter,
    wherein the adapter and dispenser form a chamber including the entry opening for receiving lubricating fluid and an exit opening for dispensing lubricating fluid onto a chain drive, and
    wherein the adapter includes a screw valve mechanism for controlling flow of lubricating fluid into the adapter.

15. The chain drive lubricating system of claim 14, wherein a screw of the screw mechanism reversibly penetrates the entry or axial opening of the adapter.

* * * * *